Patented Nov. 2, 1926.

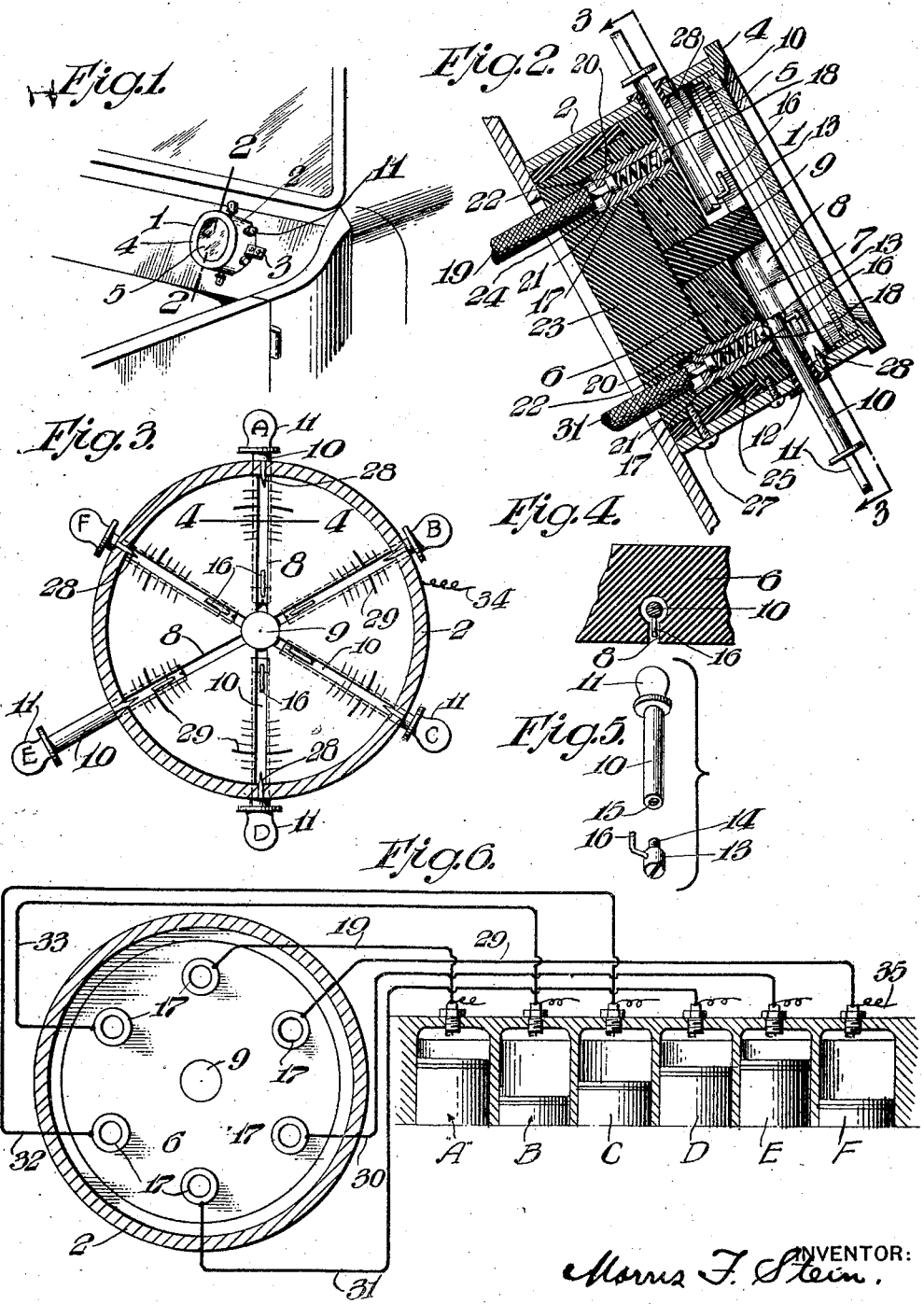

1,605,863

UNITED STATES PATENT OFFICE.

MORRIS F. STEIN, OF PHILADELPHIA, PENNSYLVANIA.

SPARK-PLUG DETECTOR.

Application filed February 3, 1923. Serial No. 616,638.

The object of my invention is to provide a novel detector for the purpose of testing the ignition system in any cylinder of an internal combustion engine of any conventional type, such as are commonly used in automobiles, trucks or other self-propelled vehicles.

Another object of this invention is to provide novel means for testing the coils or spark plugs or grounded or disconnected wires on any ignition or wiring system.

It further consists of other novel features of construction, all as will be hereinafter fully set forth.

For the purpose of illustrating my invention, I have shown in the accompanying drawings a form thereof which is at present preferred by me, since it will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a fragmentary perspective view of an instrument board of a motor vehicle, showing my invention attached to the dash thereof.

Figure 2 represents a section on line 2—2 Figure 1.

Figure 3 represents a section on line 3—3 Figure 2.

Figure 4 represents a section on line 4—4 Figure 3.

Figure 5 represents a perspective view of certain of the parts in detached position.

Figure 6 represents a wiring diagram.

Similar numerals of reference indicate corresponding parts.

1 designates my novel spark plug detector, which is applicable to any gas engine or ignition system of a motor vehicle, aeroplane or the like.

In Figure 1, my invention is shown as attached to the instrument board of a motor vehicle, the detector comprising a casing or shell 2, having the lugs 3 thereon, through which suitable fastening devices pass.

4 designates a flanged annular member adapted to hold the glass, mica or any other transparent material 5 in position. 6 designates an insulated disc which is fastened to the inner periphery of the casing 2 in any conventional manner, said disc having the apertures 7 and the recesses or channels 8 therein which extend radially from the filler piece 9, said apertures and recesses being adapted to receive the rods 10 of insulating material which extend beyond the casing and have the grasping knobs 11 thereon, see Figures 2 and 3, the same being held by the insulated bushing 12.

Each rod 10, whose portions extend within the casing 2 and into the apertures 7 has the metallic plug 13 fastened thereto by means of the shank 14 being in engagement with the aperture 15 of the rod 10, see Figure 5.

Each plug 13 has the contact member 16 extending therefrom into its slot or recess 8.

17 designates conductor bushings or sleeves externally threaded to engage the disc 6, said sleeves having contact members 18 and their respective conductors 19, 29, 30, 31, 32 and 33 mounted therein, together with spiral springs 20 interposed between the contact members 18 and conductors 19 and adapted to frictionally hold the contact members 18 against the rods 10 when they are in operation, or against the plug 13 when they are in operation, see Figure 2.

The conductors 19, 29, 30, 31 32 and 33 each have a head 21 held against the shoulder 22 by the springs 20, see Figure 2.

23 designates a block of insulation apertured at 24 to receive the conductors 19, 29, 30, 31, 32 and 33 and their sleeves 17.

In order to safeguard against any possible short circuit in the detector, I employ an insulating ring 25, which is interposed between the inner periphery of the casing 2, and the outer periphery of the block 23.

The ring 25 and block 23 are fastened within the casing or shell 2 by means of set screw 27. 28 designates contact points secured to the casing 2.

29 designates a graduation scale on the face of the disc 6, which is used to measure the length of spark between the contact members 16 and 28 when testing spark plugs and their ignition systems.

The sleeves 17 are connected to the cylinders A, B, C, D, E, and F by the leads 19, 29, 30, 31, 32 and 33 respectively, the number of leads depending on the number of cylinders.

The contacts 28 are grounded through the casing 2 to the instrument board when the same is constructed of a conductive material, and if not, a wire 34 is grounded on the vehicle frame.

The negative lead 35 from the battery is electrically connected with the movable contacts 16 by means of the leads 19, 29, 30, 31, 32, and 33, bushings 17 and contact members 18.

The operation is as follows:—

When the actuating rods 10 are in their inward position, the contact members 18 engage the rods 10, which are of insulating material, but when they are moved outwardly, the contact members 18 engage the part 13 of conducting material which is integral with its movable contact 18.

To test the spark plug in cylinder "A" the switch rod 10 is positioned to bring its movable contact about one eighth of an inch (⅛) away from its contact 28, which may be determined by the scale 29, see Figure 3. If the said plug is in good working order, a spark will be created at the gap thus formed.

If, for some reason, the spark plug is grounded, for example, by soot or carbon deposits on the insulation for the electrodes or if said electrodes are short circuited, by being in contact with each other, no spark will be created, showing that the plug being tested is inoperative.

If the spark of cylinder "A" is in good condition and the switch rod 10 is moved to bring its contact 16 into engagement with the contact point 28, no spark will be created by the plug of said cylinder "A", and the motor or engine will slow down.

When the motor vehicle is under a heavy load or climbing a steep grade and one of the cylinders seems to miss and it is desired to ascertain which one is missing, the switch rods 10 are moved in an inward and outward direction by means of its grasping handle 11, thus closing and opening the circuits between the contact members 16 and 28, this is done to each of said rods 10, one after the other in sequence.

This will cut off each cylinder separately and independently, and in doing so will shut off the power of a good cylinder, but when the circuit of a bad or inoperative cylinder is closed, it will make no difference in the operation of the motor, thus indicating the missing cylinder.

When the ignition system is to be tested, the lead wires 19, 29, 30, 31, 32 and 33 are connected to it. The rods 10 are so positioned that the contacts 16 register about one quarter of an inch away from the contacts 28. If the ignition system is in proper condition, there will be a jump spark between the gap thus formed.

It will be understood from the foregoing that all of the rods 10 during the normal operation of the motor are in a neutral position, and so long as all spark plugs are functioning properly, nothing happens, but in case one of the electrodes of the plugs is burned off, or damaged in any way that will interrupt the completion of the spark between the central electrode and the shell of such plug, it will create a longer and stronger and more intensified spark between the contacts 16 and 28, it being understood however that there is no resistance in spark plug.

It will be apparent from the foregoing that my device can be readily assembled and installed upon the instrument board or other portion of a motor vehicle and by making the contour of the casing preferably cylindrical, so that the grasping members 11 project therefrom but little space is utilized and the operating members are readily accessible to the operator.

The provision of the annulus with its transparent cover 5 prevents the entrance of dirt or dust to the interior of the casing, and the transversely located disc 6 serves as an effective support for the sleeves 17 together with the switch elements and their adjuncts, all parts being readily accessible for the purposes of inspection, replacement, or repairs, as is evident.

Having thus described my invention, what I claim as new and desire to secure by Letters Patent, is:—

A testing device comprising a casing, an insulating disc therein, radially arranged slots in the outer portion of said disc, rods of insulating material passing through said casing and slidably mounted in said radial slots, metallic plugs secured in the inner ends of said rods and provided with contact members extending in parallelism with said insulated rods, conductor bushings mounted in said disc at an angle to said insulating rods and in alignment therewith, spring pressed contact members carried in said bushings and normally in the path of and in contact with said insulating rods, said spring pressed contact members contacting with the metallic plugs in the ends of said rods when the latter are moved outwardly, and stationary contacts projecting inwardly from said casing.

MORRIS F. STEIN.